United States Patent
Ruetenik (10) Patent No.: US 7,445,051 B2
(45) Date of Patent: Nov. 4, 2008

(54) EQUINE BOOT

(76) Inventor: Monty Ruetenik, 211 Narcissus, Kemah, TX (US) 77565

( * ) Notice: Subject to any disclaimer, the term of this patent is extended or adjusted under 35 U.S.C. 154(b) by 17 days.

(21) Appl. No.: 11/652,187

(22) Filed: Jan. 11, 2007

(65) Prior Publication Data

US 2007/0107389 A1 May 17, 2007

Related U.S. Application Data (63) Continuation of application No. 10/926,771, filed on Aug. 26, 2004, now Pat. No. 7,178,321.

(60) Provisional application No. 60/508,775, filed on Oct. 4, 2003.

(51) Int. Cl.
*A01L 7/02* (2006.01)
*B68C 5/00* (2006.01)

(52) U.S. Cl. ............................ 168/28; 54/82
(58) Field of Classification Search ............ 54/82; 168/18, 26, 28, 14, 12
See application file for complete search history.

(56) References Cited

U.S. PATENT DOCUMENTS

| | | | | |
|---|---|---|---|---|
| 643,246 A * | 2/1900 | Gale | | 168/28 |
| 840,892 A * | 1/1907 | Adam | | 168/1 |
| 851,243 A * | 4/1907 | Manley | | 168/28 |
| 2,191,834 A * | 2/1940 | Slack | | 168/28 |
| 4,155,406 A * | 5/1979 | Hourlier | | 168/18 |
| 4,444,269 A * | 4/1984 | Laurent | | 168/1 |
| 4,744,422 A * | 5/1988 | Dallmer | | 168/18 |
| 4,981,010 A * | 1/1991 | Orza et al. | | 54/82 |
| 5,224,549 A * | 7/1993 | Lightner | | 168/18 |
| 6,868,656 B2 * | 3/2005 | Osha et al. | | 54/82 |
| 7,032,367 B1 * | 4/2006 | Yoho | | 54/82 |
| 2006/0064950 A1 * | 3/2006 | Ford et al. | | 54/82 |

* cited by examiner

*Primary Examiner*—Son T. Nguyen
(74) *Attorney, Agent, or Firm*—Douglas Baldwin (57) ABSTRACT

An improved equine hoof boot, boot pad and boot and pad assembly that consists of a fabric boot and dimensioned elliptical shock absorbing pad disposed inside at the bottom of the boot, the pad optionally a combination of soft and harder components and also optionally having a triangular raised frog support at the rear of a hoof stop at the front.

9 Claims, 7 Drawing Sheets

EQUINE BOOT

RELATED APPLICATIONS

This application is a continuation patent application of U.S. application Ser. No. 10/926,771, filed Aug. 26, 2004 now U.S. Pat. No. 7,178,321, and entitled to the benefit of Provisional Patent Application Ser. No. 60/508,775, filed Oct. 4, 2003, and Design patent applications Ser. Nos. 29/266,940 and 29/266935, both filed Oct. 2, 2006.

BACKGROUND

1. Field of the Invention

The present invention relates to an equine boot, boot pad and an equine boot assembly of for horses. More specifically, it relates to a unique boot, boot pad and a boot assembly to reduce stress on the legs and tendons of animals, treat animals for hoof and leg diseases and injuries and to provide comfort and leg support.

2. Discussion

People have long attempted to protect the hoofs of animals with protective devices of various sorts. Steel or aluminum shoes have been used to protect the hoofs from damage while the animal is walking or running. In recent years many animal hoof shock absorbing pads and shoes have also been proposed. Some of these shock-adsorbing shoes consist of pads attached to the hoof by means of a more or less conventional metal shoe. Others are attached by adhesives or held in place by specially designed boots. See for example U.S. Pat. No. 4,470,466, Sep. 11, 1984, U.S. Pat. No. 4,444,269 Apr. 24, 1984, and U.S. Pat. No. 4,981,010, Jan. 1, 1991. Some pads described in the patent literature are directed to the treatment of laminitis or to correct injured or anatomically incorrect hoofs. Many of the proposed pads have some means of support for the frog of the animal's hoof, e.g. see U.S. Pat. No. 5,706,898, Jan. 13, 1998.

Race and show horses are constantly being transported and are therefore standing for long periods of time on hard and unnatural surfaces. Not only horses but also other hoofed animals are also transported for sports racing, showing or breeding. For example, in some parts of the world camel racing is popular. Cattle are also transported for show and breeding. Traveling by roadway or by air subjects the animal's legs to constant vibration and jolting, putting stress on the animal's legs, tendons and joints.

Horses, particularly, have injuries and diseases of the hoof that need special treatment. The present invention greatly facilitates recovery from injured hooves and from laminitis. The boot assembly of the present invention allows horses to stand and walk more comfortably and allows the hoof to be positioned properly to allow healing.

Aspects of the novel boot assembly of the present invention were described in a previous Provisional Application, 60/348, 295, filed Oct. 22, 2001. As result of trial use of certain embodiments of the previous invention, I have discovered significant and critical improvements. Those improved embodiments are described in this application.

SUMMARY OF THE INVENTION

This invention is an improved equine boot, boot pad and boot assembly. The boot assembly consists of a shock absorbing pad, preferably a polymeric elastomer, and an anatomically correct boot constructed of sturdy flexible material designed to be easily fitted on the hoof of an animal.

DESCRIPTION OF PREFERRED EMBODIMENTS

This invention is flexible equine boot, a shock absorbing boot pad that is designed to be disposed inside and at the bottom of the boot and boot assembly that comprises a flexible boot and shock absorbing pad disposed inside and at the bottom of the boot.

The Boot

In broad aspect the boot of the present invention comprises an upper portion made from flexible material shaped to fit the hoof of an animal and of a height to reach above the hoof of the animal for which it is designed. The boot has a front, sides, rear and bottom; the front slopes back and upward, the sides are lower than the front and rear so that when the front and rear are pulled together here is an opening in the sides. There is a fastening means at the top front and rear to fasten the front and rear together around the leg of a horse. The bottom is attached to the front, sides and rear attached to a sole plate comprising a molded elastomer base circumscribed by a peripheral wall (or sides) defining a receiving area sized to fit over the bottom of the upper portion; said sole plate being securely attached to the lower circumference of the upper portion.

Figure 1:
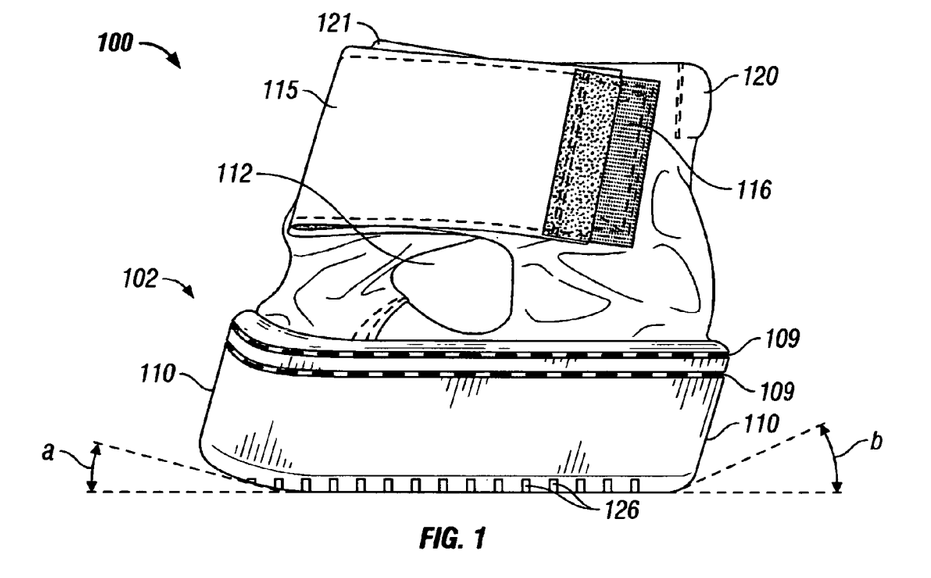
FIG. 1 is a side view of a boot of the present invention.
Figure 2:
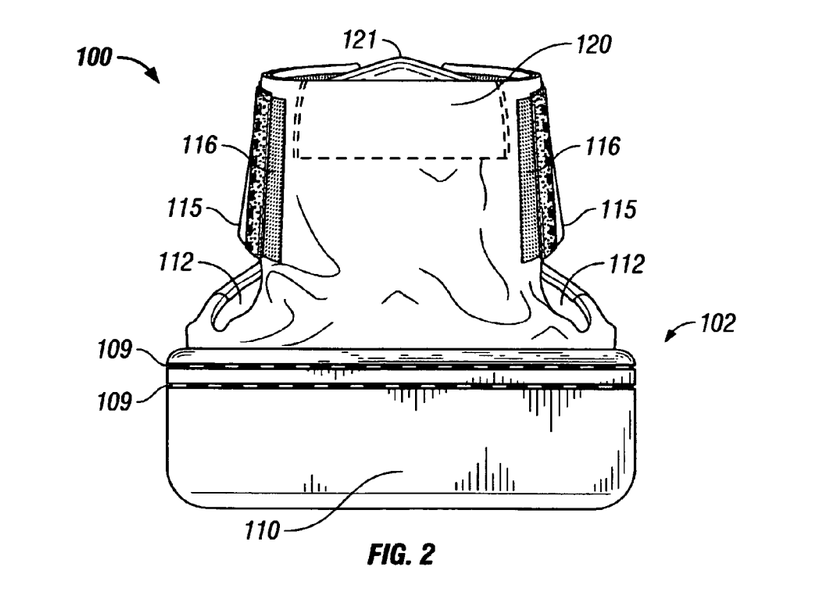
FIG. 2 is a rear view of a boot of the present invention.
Figure 5:
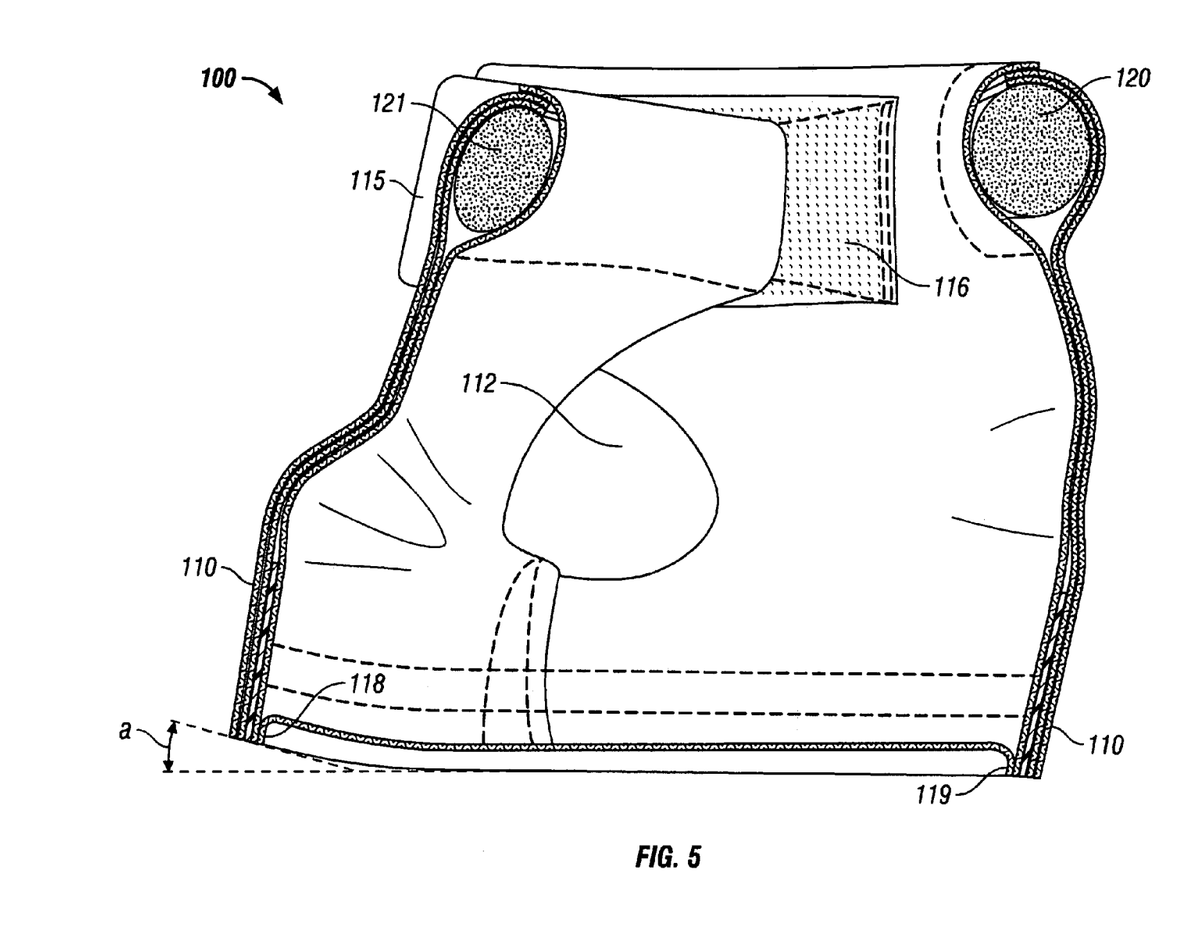
FIG. 5 is a cut-a-way side view of a boot of the present invention.
Figure 6:
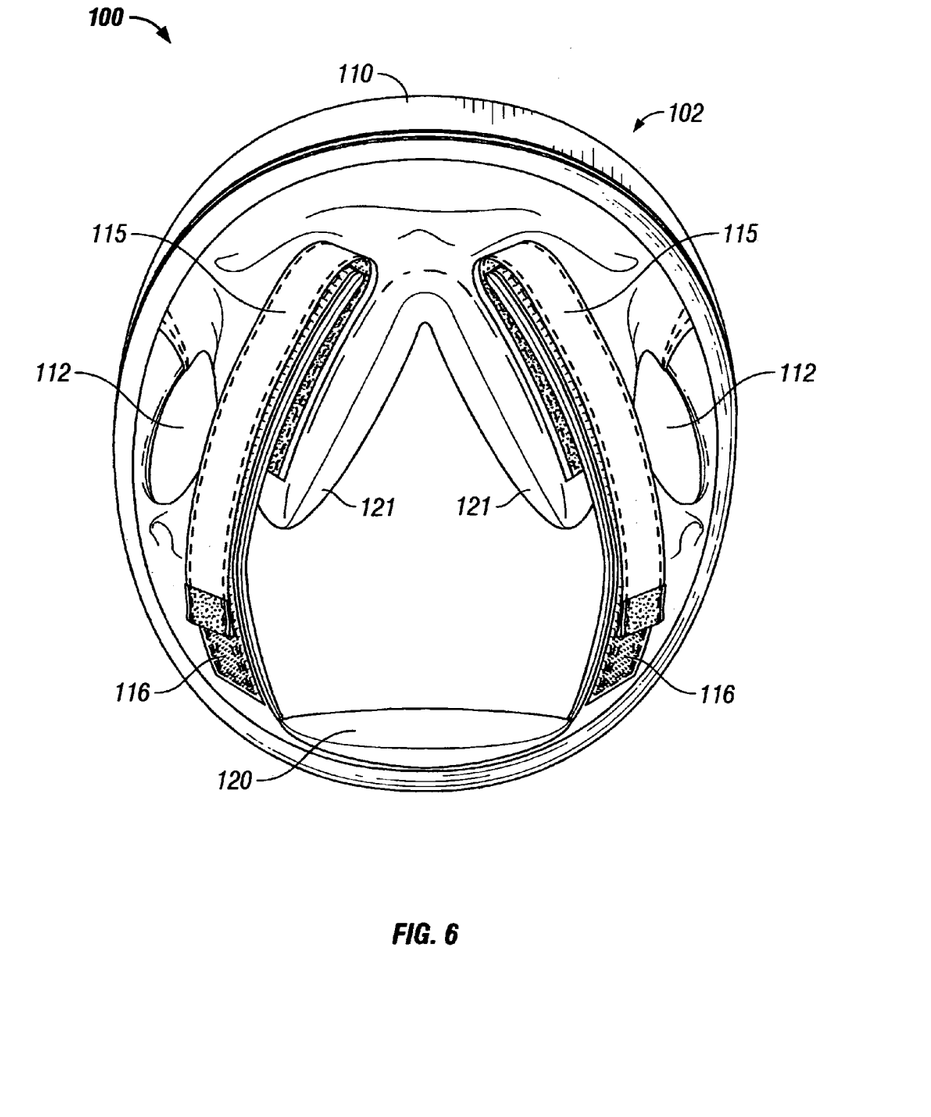
FIG. 6 is a top view of a boot of the present invention showing attachment straps in a closed position.
Figure 7:
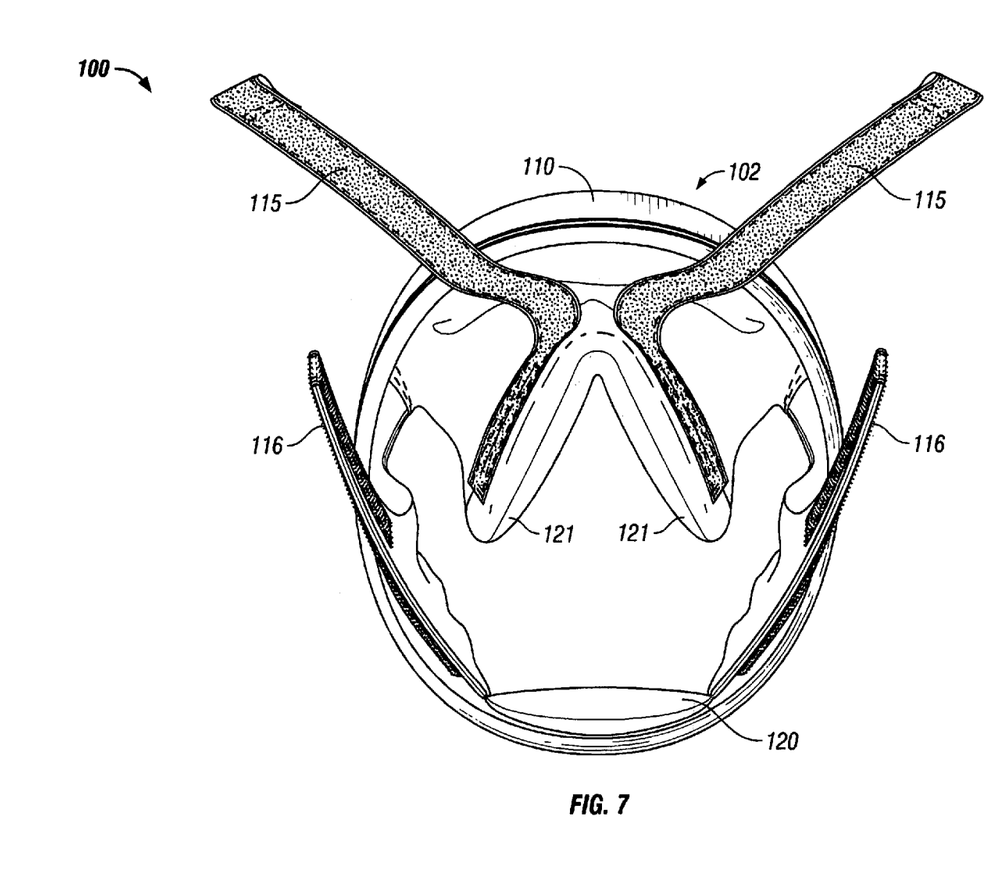
FIG. 7 is a top view of a boot of the present invention showing attachment straps in an open position.

The boot is shaped to fit snugly on the hoof of an animal when fastened. FIGS. 1-3 and 5-7 depict embodiments of the invention. As seen in FIGS. 1 and 5, the boot slopes from bottom to top on the front to correspond to the slope of the animal's hoof The angle of the slope is between 20 to 50 degrees. Preferably the angle is from 30 to 50 degrees and a 45 degree angle has been found very suitable.

The boot consists of a body, side openings (112) and closure straps (115) and (116) and sole plate (110). The size of the boot will vary according to the size of the hoof of animal on which it will be used. Generally, for horses, the boot will be sized to accommodate a four (4) to nine (9) inch diameter pad, about four (4) to ten (10) inches from front to rear. The height from sole to the top will be sufficient to clear the hoof so the boot top may be secured around the leg above the coronary band and the bulbs of the heel of the animal. The boots are from about three (3) to eight (8) inches in height. In one embodiment the rear side of the boot will be 4.5 to six (6) inches from the top to the bottom of the sole plate with the front side slightly longer (to account for the slope of the front side). There are openings (112) along the side of the boot to allow it to be opened for placing on the animal's hoof Large openings allow the boot to be easily fitted on a horse's hoof and provide ventilation for the hoof and lower leg. These opening also allow access to the hoof for treatment. The distance of the openings from the sole will be sufficient to cover shock-absorbing the pad and the length of the slit will be sufficient to allow the boot to be opened to easily slip onto the hoof. For horse boots, the opening on the sides will ideally start about two (2) to three (3) inches from the sole and be about three (3) to five (5) inches in width.

The top of the boot is enclosed around the leg of a horse by fastening means. Suitable attaching means can consists of straps, illustrated by 115 and 116 of FIGS. 1-3, and 5, that operate by connecting the straps 115 and 116 so that the opening fits snugly around the leg of the animal. The straps consist of a first set attached to the rear top of the boot that are attachable to a second set of straps attached to the front top side of the boot by any convenient means. The attachment overlaps the front straps over the rear straps to secure the rear strap top and bottom. This gives a secure and reliable closure. A suitable fastening means is a strap attached to the front having attached to both sides one half of a of loop and hook connector (for example, Velcro®) and a strap attached on the rear having connected to both sides thereto the other half of a hook and loop connector. The strap is from about one half to three (3) inches in length. The straps may also be buttoned, snapped or tied, but preferable are attached by hook and loop straps (for example Velcro®)

The boot is made of any suitable flexible material, such as leather, woven or non-woven fabric. It has been found desirable to use a double layer of fabric as illustrated in FIG. 5, but this is not essential. A particularly suitable fabric is an 18 oz. Ballistic cloth used by the U.S. military for bags. A DuPont nylon woven fabric, CORDURA® available in several weights, may be used. The 330 denier fabric is preferred.

When made of fabric the upper boot will have sides with a fabric bottom attached to the sides by stitching as shown in FIG. 5 (118,119). The stitching area may make a sizable ring of material at the bottom of the fabric upper boot—this is easily accommodated in the present invention by a groove 104 in FIG. 8 in the sole plate.

In one embodiment there is a strip of hook and loop fastener attached to the top side of the bottom fabric of the upper fabric boot. This strip is positioned to mate with a matching strip of hook and loop fastener on the bottom side of a shock absorbing pad. When assembled the two sides of the hook and loop fasteners connect to secure the pad to the bottom of the fabric boot to prevent rotation of the pad during use. The hoof of a horse on which the boot is fitted exerts tremendous pressure and turning torque on the pad. The hook and loop attachment prevents the pad from rotating. The strips are from 0.5 to four (4) inches in length and from 0.5 to 2.5 inches in width. The matching hoop and loop fastener on the pad is secured to the pad as described below.

Figure 8:
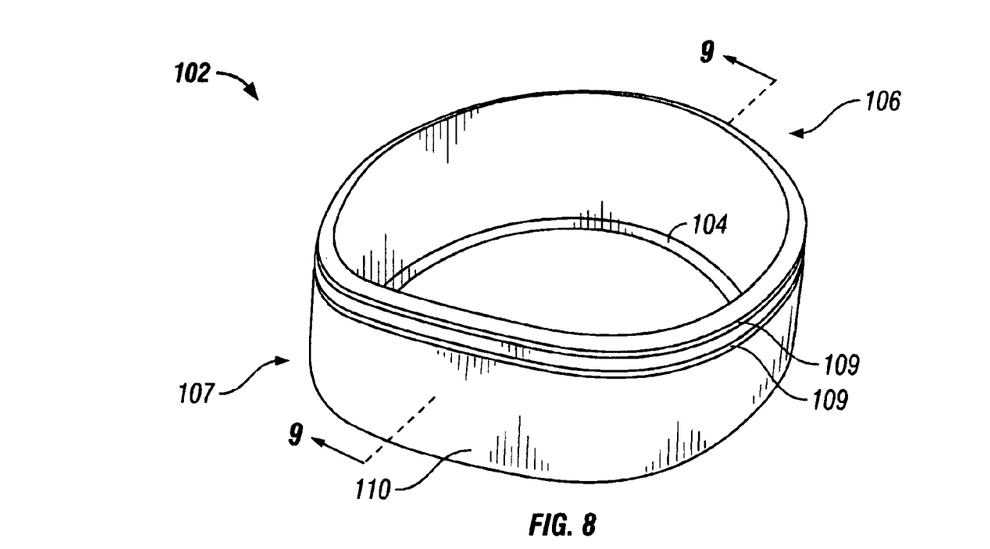
FIG. 8 is an isomeric view of a sole plate of the present invention.

It is preferred, that the front and rear tops of the boot at points (120) and (121) be padded. The padding is constructed by enclosing a polymeric foam, closed cell rubber pad, or other suitable resilient material, inside a pouch of the fabric at the top of the from and rear of the boot of the boot. As shown in FIG. 5 (120,121), a round section of polymer foam padding is very suitable. Such padding may be the kind used in door insulation or expansion joints for concrete driveways or sidewalks. Any polymer foam is suitable as is cotton or synthetic fiber padding. This padding allows a closer and more secure fit around the animal's leg. The rear pad should be above the bulbs of the hoof so that the boot does not rotate. A round foam pad of about 1 inch in diameter is generally ideal. Padding of 0.5 to about 1.5 inches is desired. The padding as illustrated in FIG. 8 (120,121) is about one (1) to 2.5 inches in length. As can be seen in FIG. 5 the padding in the rear of the boot is a single pad (120) whereas the padding in the front (121) is separated by stitching; each side being about one (1) to 2.5 inches in length.

The sole plate 110 in FIGS. 1-3 and 8-9) is of special importance. The sole plate is a separate molded piece and is attached to the bottom of the fabric upper. The sole plate consists of a bottom plate (108) in FIGS. 8 and 9 and walls or sides (106 and 107) that extend upward. The sole plate bottom is preferably about 0.375 inches to 0.65 inches thick, but may be from 0.2 to 0.75 inches in thickness. The sole plate wall (110) will extend upward 1.5 to 2.25 inches in the rear wall (107) and 1.75 to 3 inches in the front wall (106) about 0.75 inches to about 2.25 inches, measured from the bottom of the sole plate surface.

The sole plate is preferably molded of polymeric elastomer material or hard rubber (having the consistency and hardness to approximate automobile tires). Thermoplastic polyurethanes (TPUs) are suitable materials for the base plate. It is preferred that thermoplastic polyurethanes of about 55 to 75 Shore A hardness be used, with Shore A hardness of 65 to 70 being especially suitable. Other polymer materials of the same characteristics the thermoplastic polyurethanes are also usable. Choice of these will be well within the ability of those skilled in the polymer art to select.

The sole plate is attached to the bottom of the fabric boot. The attachment is preferably accomplished by either an adhesive and/or mechanical means, for example, the may be first attached by a suitable adhesive then sewn to the lower portion of the cloth boot. It has been found that two rows of stitching is especially preferred to prevent the sole from coming detached from the fabric upper during use. A double row of stitching is indicated in FIGS. 1, 2, 3 and 8 (109).

Figure 9:
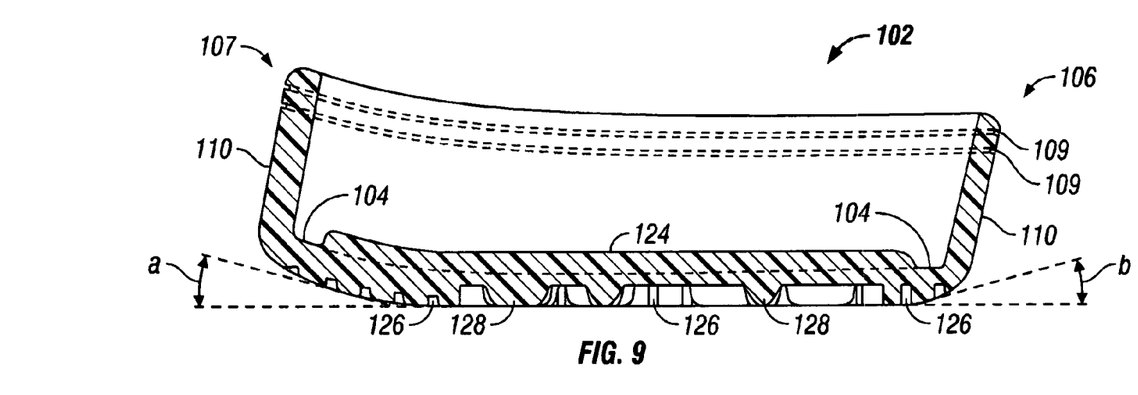
FIG. 9 is a cut-a-way side view of a sole plate of the present invention.

It is also desirable that the sole plate have a groove in the inside bottom (104 in FIG. 9). This groove allows a recess space for the seam (118 in FIG. 5) in the bottom of the upper fabric boot. The depth of this groove will depend on the size of the seam in the cloth upper of the boot but generally will be about 0.25 inches.

Figure 3:
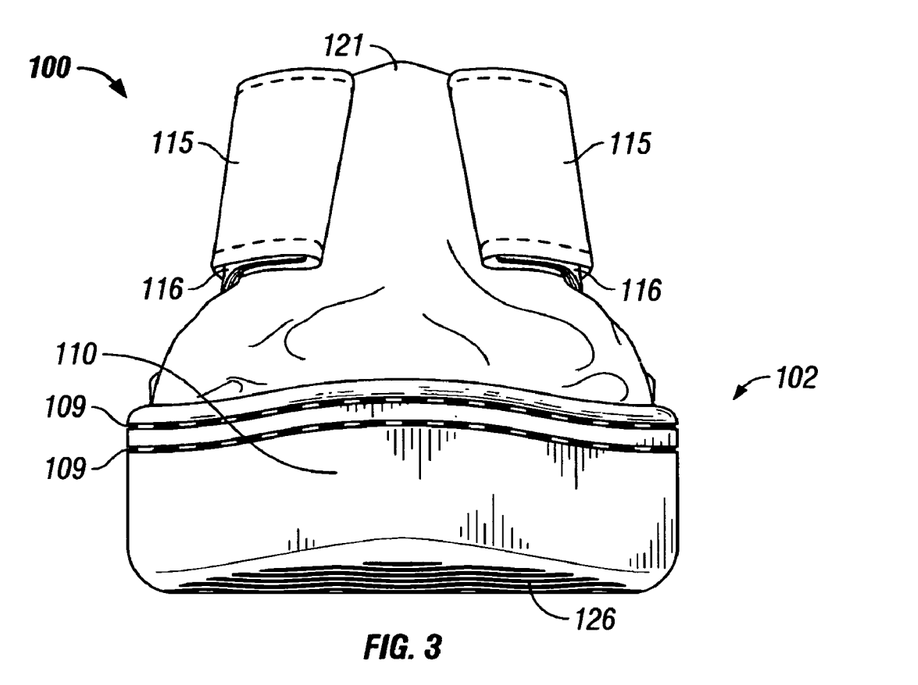
FIG. 3 is a front view of a boot of the present invention.

In a preferred embodiment the bottom of the sole plate is sloped upward in the front at an angle (a in FIG. 9) of about five (5) to thirty (30) degrees the from the bottom plane as shown in FIGS. 1, 3 and 9. FIG. 9 illustrates the slope more exactly. The slope begins at a point on the bottom of the sole plate twenty (20) to forty (40) percent of the of the length from front to rear of the sole plate. The point of beginning is preferably about ⅓ of the distance from the front of the length of the sole plate. The edges of the sole may also be rounded as shown by angle b in FIG. 9.

Figure 10:
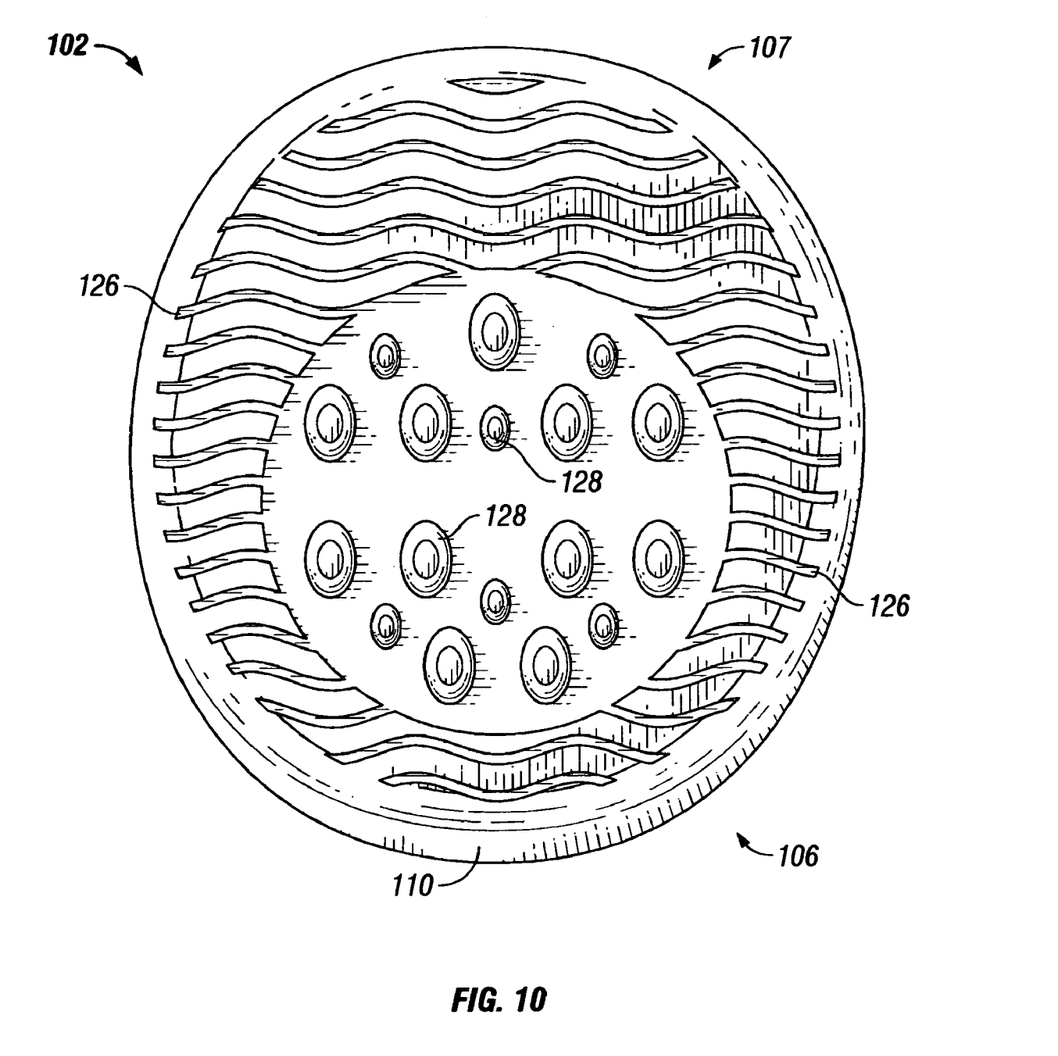
FIG. 10 is a bottom view of a sole plate.

The sole plate is preferably patterned, i.e. cleated or ridged, on the bottom. A suitable cleated design is shown in patent application, Ser. No. 10/926,771, filed Aug. 26, 2004, now U.S. Pat. No. 7,178,321, the relevant disclosure of which is herein incorporated by reference. A very suitable patterned design for the bottom of the sole plate is shown in FIG. 10 and in Design patent application Ser. No. 29/266,935, filed Oct. 2, 2006, the disclosure of which is herein incorporated by reference. This design allows for excellent traction by the slanted ridges (126 in FIG. 9) on the front and rear of the sole and more flexibility in the center (128 in FIG. 9) of the sole under the section of the boot where the frog of the hoof is placed. This flexibility provides more comfort for a horse with an injured or diseased hoof. Other designs and cleat arrangement will be well within the skill on those in the art.

The Pad

Figure 4:
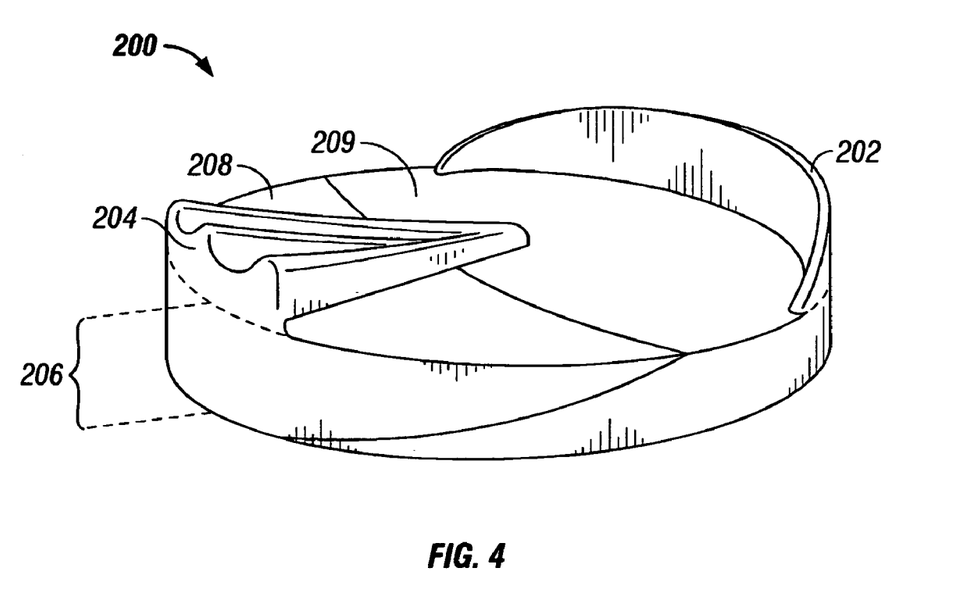
FIG. 4 is an isomeric view of a shock-absorbing hoof pad of the present invention.

Referring to the drawings, FIG. 4 illustrates an embodiment of a shock-absorbing hoof pad (200) according to the present invention. The base (206) is generally shaped to approximate the shape of the animal's hoof print. This pad, made of shock absorbing material can be easily trimmed to conform to the hoof of the individual animal on which it will be used. The base may be from about 0.25 to two (2) inches in thickness. Thickness of from about 0.25 to 0.75 inches works well. In one embodiment, the base is tapered from back to front with the back being from about one (1) to 1.5 times the thickness of the base. In one preferred embodiment the base will be about one (1) inch thick in back and about 0.5 inch thick in front. Such a tapered base is useful for pads for horses that suffer from laminitis where it is desirable to have the hoof tilted forward to relieve separation of the laminae. See U.S. Pat. No. 5,706,898.

In one embodiment, the base (206) has a ridge that acts as a stop (202) on the front side of the base. This is to prevent the hoof from slipping to far forward in use. The front ridge (202) of the pad is important to prevent the front of the hoof from protruding excessively forward. This helps to keep the hoof positioned correctly over the triangular frog support during use. For pads larger than six (6) inches across, the ridge must be at least 0.60 inches above the sole of the pad. It is preferred that it be about 0.75 inches above the sole plate. For smaller pads, of less than six (6) inches across, the ridge is at least 0.375 to 0.5 inches above the sole. The front ridge should be at least 10% of the circumference of the base centered on a point in the front of the base. It may be as much as sixty (60) percent of the circumference but about twenty five (25) to thirty five (35) percent is preferred. The front ridge is preferably made from the same material as the base and may be molded as a single piece.

On the backside of the base, opposite the ridge, is a frog support (204). This is a triangular projection above the surface of the base. This triangular projection is designed to approximately correspond to the shape and location of the frog of a horse's hoof It has been found that the height of the frog support from the sole is very important to provide adequate uniform pressure as well as cushioning of the hoof This frog support provides increased blood flow to the leg of the animal. The height at the rear of the frog support must be at least 0.5 inches from the sole for larger pads (above six (6) inches across) and at least 0.375 inches above the sole for smaller pads (up to six (6) inches across). The front of the frog support must be at least 0.15 inches above the sole of the pad and may be between 0.15 to 0.25 inches. A height of 0.175 to 0.195 is preferred and for many applications a height of 0.1875 is ideal. The height of the frog support projection above the base at the rear of the triangle in relation to the height at the front of the triangle [the small end or apex of the triangle] is in the ratio of between 2/1 to 5/1. For, example if the height of the projection at the rear of the triangle is 0.45 inches above the surface of the pad and the height at the apex of the triangle is 0.15 inches, the ratio is 3/1.

The function of the triangle projection is to contact the frog during use, to provide a kind of massage to the frog of the hoof Thus, blood circulation is stimulated and stress on the animal's legs and tendons are relieved. It is well known that the hoof frog acts somewhat as a blood pump. See for example, U.S. Pat. No. 4,981,010 where it is stated "The horny frog (58) is very elastic and acts as a shock absorber and as a second heart to the horse. As the hoof is pressed against the ground, old blood is forced up and out of the foot. When the hoof is lifted off the ground, the elastic frog (58) springs back, letting new blood into the foot." The frog support of the present invention aids in this blood circulation.

The frog support may be concentric triangles, as shown in FIG. 4, or may be a single triangle. With two or more concentric triangles the support may be made of the same material as the base and may be molded as a single piece, but it may also be made of a material of different hardness, preferable softer. The support may be molded together with the base, thus avoiding a separate step of adhering it to the base. If the support is not molded of the same material as the base or molded to the base, it is attached to the base by a suitable adhesive such as an epoxy or polyurethane adhesive. A suitable means of attaching the softer frog support is to mold the support to the harder base before the base material is fully cured. For example, the base is poured into a mold and allowed to partially set then the frog support projection is poured into a second mold appropriately placed on. top of the partially cured base, allowing the parts to bond together. Other suitable means and variations will be apparent to those skilled in the art.

In other embodiments, the pad will not have the triangular projection or the front. When use with a horse that has an abscessed or injured frog it may be desirable to use a pad without the frog support. Also the improved sole plate of the boot it is possible to eliminate the front ridge for some applications. However, even without the frog support the front ridge projection is often useful, especially with a horse with a severely injured or damaged hoof At times it is necessary to resection (remove the front hard hoof surface) a horses hoof if it is damaged or diseased. Such is the case with advanced laminitis. In such cases the soft front support ridge provides extra comfort to the hoof, especially if the pad is wedged shaped in a way that forces the front of the hoof downward. It is the burden of the pad base to supply the bulk of the support for the animal. The frog support is an aid to stimulation of the frog and is not the principal means of supporting the hoof In this way, the present invention differs from previous frog support shoes or pads. An advantage of the relative large and soft support of the present invention is that it enables the horse to adjust the position of its hoof to the most comfortable position, much like it could do if standing in a bed of sand.

It has been found that the shape of the pad is of special importance. Round pads have been found to not perform well in actual use; they tend to rotate in the boot. An elliptical shaped pad is required to maintain consistent fit and to prevent rotation in the shoe in use. The base of the pad is made of any suitable elastomeric polymer material that provides flexibility, shock absorbency, some degree of elasticity, resilience and has dimensional stability. Polyvinyl chloride PVC) elastomers are also suitable. In a preferred embodiment, the base is constructed of a casting polyurethane elastomer. For example polyurethane-casting elastomer having a Shore A hardness of from about 10 to about 70 is suitable. It is preferred that the base be of about 20 to 70 Shore A hardness and the support be of about 8 to 50 Shore A hardness. One material used in an embodiment of the invention is GTS-10 to GTS-40, a urethane casting elastomer available from Win-Tech Products Corp. P.O. Box 1114, Tomball, Tex., 77377.

In another important embodiment the base of the pad is made of two components of different densities or hardness, herein referred to a duel density pad illustrated in FIG. 4 (208,209). This pad has base comprising a front component of shock absorbing material of lower hardness than a rear component, the front component comprising the forward 20 to 40 percent of the length from front to rear of the pad and the rear component comprising 20 to 40 percent of the length of the base from front to rear, wherein the two components overlap in the center of the base that is not occupied solely by the front or rear component. A very useful pad is made with the front component comprising about ⅓ of the length, the rear component ⅓ of the rear and ⅓ overlap. A very suitable duel density pad will be made of a polyurethane elastomer; the front component (209) having a Shore A hardness of less than twenty (20) and the rear component (208) having a Shore A hardness of between 20 and 40. More desirability the front has a Shore A of 5 or less, and the rear component a Shore A of about 28-32. Elastomers, such as polyurethane elastomers can be formulated in wide range of rebound resiliencies. For the pad of this invention it is preferred that the pad material have low rebound resiliency, generally lower that twenty five (25) percent, and more desirably between two (2) and ten (10) percent.

It is also desirable to attach a hook and loop strap to the underside of the pad to mate with a matching hook and loop strap on the bottom fabric of the upper boot. When the mating straps are connected it prevents the pad from rotating in the boot during use of a horse. It is often difficult to secure a hook and loop the elastomer pad. It has been found that the strap can be strongly secured if the loop side, and one having loops on both sides of the strap, of the hook and loop fastener is coated with uncured polyurethane polymer and pressed into the uncured base of the pad, before it cures and sets. When set the fastener straps are securely attached.

The Boot/Pad Assembly

The equine boot assembly of this invention comprises a boot as described above together with a pad as described above disposed in the bottom of the boot. When applicable, the triangular projection on the top of the pad is upward so as to contact the frog of the horse onto which the boot assembly is fitted. It is desirable that the pad be attached to the bottom fabric as described above.

Boot Assembly Kit

In one embodiment this invention is a kit comprising a fabric boot as described above and a pad, as described above, specially adapted for use in the boot. The advantage of the kit is that the parts may be sold separately as original equipment or as replacement. For example if the boot or the pad wear out before the other, the appropriate kit part may be obtained without the necessity of purchasing the entire assembly. Also the kit may comprise a boot and a variety of specially adapted pads. For example, there may be pads with varied heights of the frog support projections.

Use of the Boot Assembly

In operation, a suitable size and style pad is inserted into a suitable sized boot and slipped on the hoof of the animal. In some cases it may be desirable to have the pad attached to the inside base of the boot. Attachment maybe made permanent as with an adhesive, but it is preferred that the pad be removable. A suitable removable attachment is made by adhering hook and loop (e.g. Velcro®) fabric (hook to one and loop to the other) the inside bottom of the boot and to the underside of the pad. A Velcro® attachment has been found to work well in practice.

The boot assemblies are particularly suitable for use on animals during transport, but because they are carefully matched to the individual animal and securely attached, they may also be used in many other applications. In one embodiment this invention is a method of transporting animals. The animal to be transported is fitted with a boot assembly according to the disclosure herein and transported, by truck by train or by airplane. It has been found that animal transported with a suitable boot assembly as described herein suffer far less stress and arrive more rested and in better condition than those transported otherwise.

The boot assemblies of this invention are valuable for use with injured hooves and for use on animals that are confined to small places with hard surfaces.

An additional and important application of the present invention is in the elimination of rotational torque on the leg ligaments, usually associated with exercising a horse on a standard small diameter walker. The elliptical shape of the pad, as well as the secure attachment of the pad to the bottom of the boot eliminates turning of the pad. The design on the boot was accomplished by observing the legs of horses when exercising on a "merry-go-round" walker. Most horsemen have found the use of a traditional merry go round type of walker, as an effective economical way to exercise and or cool horses after a workout. The pad having a soft subsurface, absorbs some of the rotational torque that normally would be stressing the anatomical structures of the horses leg. This is especially beneficial after a workout when the horse is already fatigued. The standard insert pad on a regular horseshoe, is too thick and breaks nails out of the hoof, hence dislodging the shoe. The patterned or cleated bottom of the present invention provides a safety surface (or solid footing) for the foot. The patterned bottom reduces slippage, which is especially important on physically fatigued equine ligaments and tendons after exercise and after a workout. Many other uses will occur to those skilled in the art, as will variations in materials and configuration, all within the scope of the present invention.

Treatment of Laminitis

In one embodiment the invention is a method for treatment of laminitis in horses. Laminitis in horses, as well as treatment options, including hoof frog support is well described in U.S. Pat. No. 5,706,898. The description and treatment options for laminitis of U.S. Pat. No. 5,706,898 are incorporated herein by reference. The method of the present invention comprises fitting a horse suffering with laminitis with a boot assembly as described above for sufficient time to reduce inflammation and keep pressure on the sole and frog of the hoof For example, a horse suffering with laminitis may have a boot assembly, as described above, placed on him for a few hours each day. It is preferred to use a pad that is tapered from back to front. For example, the base will be about one (1) inch thick in back and about 0.5 inch thick in front. It is also useful to start a horse with laminitis with a relatively soft pad or a duel density pad as described above, then as the hoof heals, to progress to harder pads.

The invention described herein may be embodied in other specific forms without departing from the spirit or essential characteristics thereof The present embodiments considered in all respects as illustrative and are not restrictive, the scope of the invention being indicated by the appended claims, and all the changes that come within the meaning and range of equivalency of the claims are intended to be embraced therein.

I claim as my invention:

1. A shock-absorbing equine boot pad for use inside an equine boot comprising a shock-absorbing base, positioned as the topmost pad in the equine boot, comprising a front component of shock absorbing material of lower hardness than a rear component, said front component comprising the forward twenty to forty percent of the length from front to rear of the pad and the rear component comprising twenty to forty percent of the length of the base from front to rear, wherein the two components overlap in the center remaining length of the base that is not occupied solely by the front or rear component.

2. The boot pad of claim 1 wherein said front component comprises the forward ⅓ of the length from front to rear of the pad and the rear component comprises ⅓ of the length of the base from front to rear, wherein the two components overlap in the center of the base not occupied solely by the front or rear component so that the pad will have the front ⅓ of lower hardness and the rear ⅓ of a greater hardness and the center ⅓ of an overlap of the two materials.

3. The boot pad of claim 2 wherein the base has a semi-circular projection above the surface of the top of the pad that extends along at least ten percent of the circumference of the base to provide a stop for an animal hoof and wherein there is a triangular projection of the pad opposite the said semi-circular projection that is tapered from front to back and the back projects at least 0.375 inches above the surface of the base and in which the front of the triangular projection projects at least 0.15 inches above the surface of the base of the pad.

4. The pad of claim 3 wherein the base has a triangular projection at the rear of the pad above the top surface of the pad, and a semi-circular projection above the surface of the top of the pad that extends along at least ten percent of the circumference of the base opposite the triangular projection to provide a stop for an animal hoof and wherein the triangular projection of the pad is tapered from front to back and the back projects at least 0.375 inches above the surface of the base and the front projects at least 0.15 inches above the surface of the base of the pad.

5. The boot pad of claim 1 wherein the front component and rear component are made of a polyurethane elastomer; the front component having a hardness of less than Shore A hardness of twenty (20) and the rear component having a Shore A hardness of between twenty (20) and forty (40).

6. The boot pad of claim 1 wherein the front component and rear component are made of a polyurethane elastomer; the front component having a Shore A hardness of less than fifteen (15) and the rear component having a Shore A hardness of between twenty eight (28) and thirty two (32).

7. The boot pad of claim 1 wherein the elastomer has a bounce resilience of between two (2) and twenty five (25) percent.

8. An equine boot assembly comprising:
an equine boot comprising an upper section made from flexible material, shaped to fit around the hoof of horse and of a height to reach above the hoof of the horse, comprising an upper portion, comprising a solid front, sides, solid rear and bottom, wherein the front slopes back and upward, the sides are lower than the front and rear so that when the front and rear are pulled together there is an opening in the sides; a fastening means at the top front and rear to fasten the front and rear together around the leg of a horse, and a said bottom is attached to the front, sides and rear, and;
a sole plate comprising an elastomer base circumscribed by a peripheral wall defining a receiving area sized to fit over the bottom of the upper section, said sole plate being securely attached to the lower circumference of the upper portion, and;
a pad comprising a shock-absorbing base comprising a front component of shock absorbing material of lower hardness than a rear component, said front component comprising the forward twenty to forty percent of the length from front to rear of the pad and the rear component comprising twenty to forty percent of the length of the base from front to rear, wherein the two components overlap in the center remaining length of the base not occupied solely by the front or rear component;
wherein the pad is disposed inside and at the bottom of the boot so as to contact the hoof of a horse when placed into the boot.

9. The equine boot assembly of claim 8 wherein the bottom of the upper section made from flexible material has attached thereto one part of a hook and loop fastener and the pad has attached to the bottom the other half of a hook and loop fastener, both positioned to mate together to secure the pad to the bottom of the fabric boot.

* * * * *